US 7,949,516 B2

(12) United States Patent
Fux et al.

(10) Patent No.: US 7,949,516 B2
(45) Date of Patent: May 24, 2011

(54) HANDHELD ELECTRONIC DEVICE AND METHOD EMPLOYING LOGICAL PROXIMITY OF CHARACTERS IN SPELL CHECKING

(75) Inventors: Vadim Fux, Waterloo (CA); Michael Elizarov, Waterloo (CA); Sergey V. Kolomiets, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 905 days.

(21) Appl. No.: 11/848,895

(22) Filed: Aug. 31, 2007

(65) Prior Publication Data

US 2009/0063135 A1    Mar. 5, 2009

(51) Int. Cl.
*G06F 17/20* (2006.01)
*G06F 17/22* (2006.01)

(52) U.S. Cl. .................. 704/8; 704/1; 715/257

(58) Field of Classification Search .............. None
See application file for complete search history.

(56) References Cited

U.S. PATENT DOCUMENTS

| 5,761,689 | A  | * | 6/1998  | Rayson et al. ............ 715/210 |
| 5,818,437 | A  |   | 10/1998 | Grover et al. |
| 6,047,300 | A  | * | 4/2000  | Walfish et al. ............ 715/257 |
| 6,085,206 | A  | * | 7/2000  | Domini et al. ............ 715/257 |
| 6,292,771 | B1 | * | 9/2001  | Haug et al. .................. 704/9 |
| 6,377,965 | B1 | * | 4/2002  | Hachamovitch et al. ..... 715/203 |
| 6,618,697 | B1 | * | 9/2003  | Kantrowitz et al. ......... 703/22 |
| 6,801,190 | B1 |   | 10/2004 | Robinson et al. |
| 7,047,493 | B1 | * | 5/2006  | Brill et al. ............... 715/257 |
| 2004/0093567 | A1 | * | 5/2004 | Schabes et al. ............ 715/533 |
| 2007/0094024 | A1 | * | 4/2007 | Kristensson et al. ........ 704/252 |
| 2008/0077396 | A1 | * | 3/2008 | Hsu ........................ 704/10 |
| 2008/0114590 | A1 | * | 5/2008 | Scott ....................... 704/9 |

FOREIGN PATENT DOCUMENTS

| EP | 1050794        | 11/2000 |
| EP | 1603017 A1     | 12/2005 |
| WO | 2005/008899 A1 | 1/2000  |

OTHER PUBLICATIONS

Extended European Search Report from the European Patent Office for corresponding EP Application No. 07115476.9, dated Dec. 19, 2007 (7 pages).

Examination Report from the European Patent Office for corresponding EP Application No. 07115476.9, dated Dec. 1, 2008 (3 pages).

Examination Report from the European Patent Office for corresponding EP Application No. 07115476.9, dated Aug. 8, 2009 (5 pages).

(Continued)

*Primary Examiner* — Talivaldis Ivars Smits
*Assistant Examiner* — Jesse S Pullias
(74) *Attorney, Agent, or Firm* — Finnegan, Henderson, Farabow, Garrett & Dunner, LLP

(57) ABSTRACT

An improved handheld electronic device and associated method employing an improved spell checking routine enable proposed spelling corrections having a close logical proximity to an active input to be output at a position of preference for easy selection by the user. By way of example, a base character and the various accented forms thereof can be said to have a logical proximity to one another that is closer than their logical proximity to any character having a different base character, whether additionally having a diacritical element or not.

14 Claims, 7 Drawing Sheets

OTHER PUBLICATIONS

Examination Report from the European Patent Office for corresponding EP Application No. 07115476.9, dated Oct. 15, 2010 (7 pages).

Office Action from the Canadian Patent Office for corresponding Canadian Application No. 2,639,221, dated Mar. 8, 2011 (3 pages).

* cited by examiner

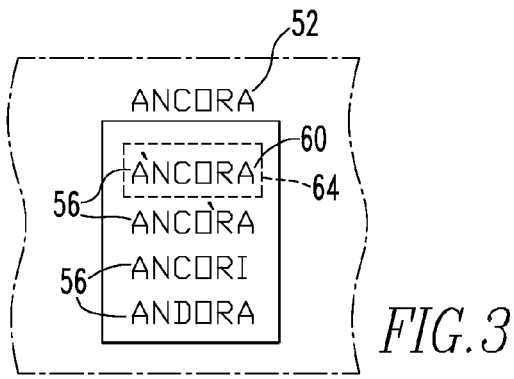
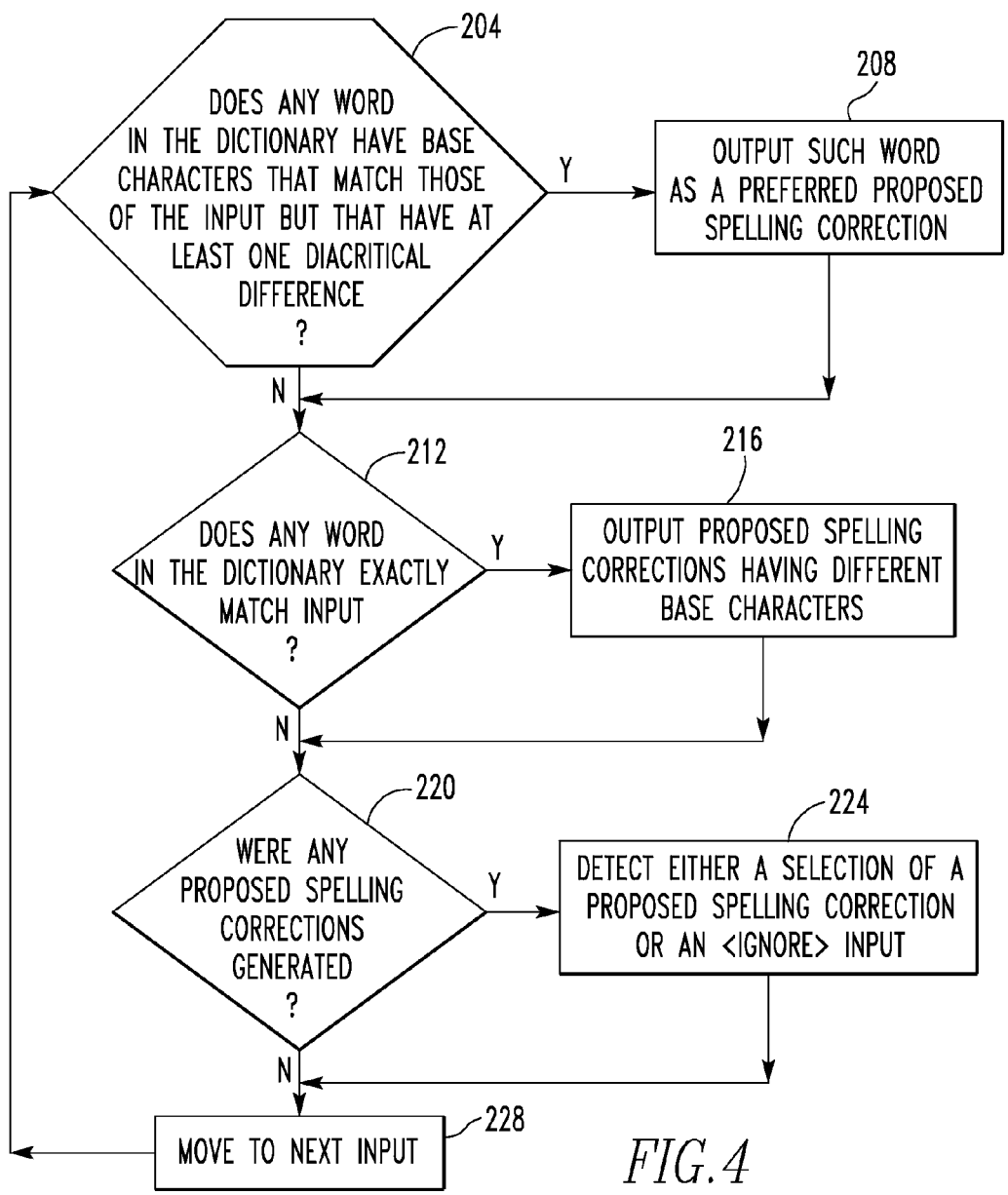
FIG.3
FIG.4

HANDHELD ELECTRONIC DEVICE AND METHOD EMPLOYING LOGICAL PROXIMITY OF CHARACTERS IN SPELL CHECKING

BACKGROUND

1. Field

The disclosed and claimed concept relates generally to handheld electronic devices and, more particularly, to a handheld electronic device and an improved method employing the logical proximity of characters in a spell checking operation.

2. Description of the Related Art

Numerous types of handheld electronic devices are known. Examples of such handheld electronic devices include, for instance, personal data assistants (PDAs), handheld computers, two-way pagers, cellular telephones, and the like. Many handheld electronic devices also feature wireless communication capability, although many such handheld electronic devices are stand-alone devices that are functional without communication with other devices.

Spell checking functions are generally known, but spell checking functions typically rely upon base characters in determining whether or not an input such as a word is misspelled. For instance, the twenty-six Latin letters are considered to be base characters, and many of the Latin letters can additionally have one or more diacritical forms, such as when a Latin letter base character additionally includes a diacritical mark or accent, such as a circumflex, a cedilla, a tilde, etc. In some languages, such as the Italian language, the various accenting applied to the various characters in words can determine the grammatical content of the words, and certain grammatical rules exist which require certain accented forms in certain circumstances, such as at the end of a sentence.

Most electronic devices that have a text input function are capable of generating all of the various diacritical forms of the twenty-six Latin letters. Unfortunately, generation of the diacritical forms of Latin letters can be cumbersome. In some circumstances, it may be necessary to consult a table of diacritical forms of base letters in order to choose and insert a particular diacritical character. In other circumstances, it is necessary to scroll through a list of the various diacritical forms of a letter in order to identify and select a preferred diacritical form. Not only can such effort be cumbersome, but also it is error prone. It thus would be desirable to provide an improved electronic device and method that overcome these and other shortcomings.

BRIEF DESCRIPTION OF THE DRAWINGS

A full understanding of the disclosed and claimed concept can be obtained from the following Description when read in conjunction with the accompanying drawings in which:

FIG. 3 is an exemplary output that can be generated by an improved method in accordance with the disclosed and claimed concept;

FIG. 4 is an exemplary flowchart depicting a portion of the improved method;

Similar numerals refer to similar parts throughout the specification.

DESCRIPTION

Figure 1:
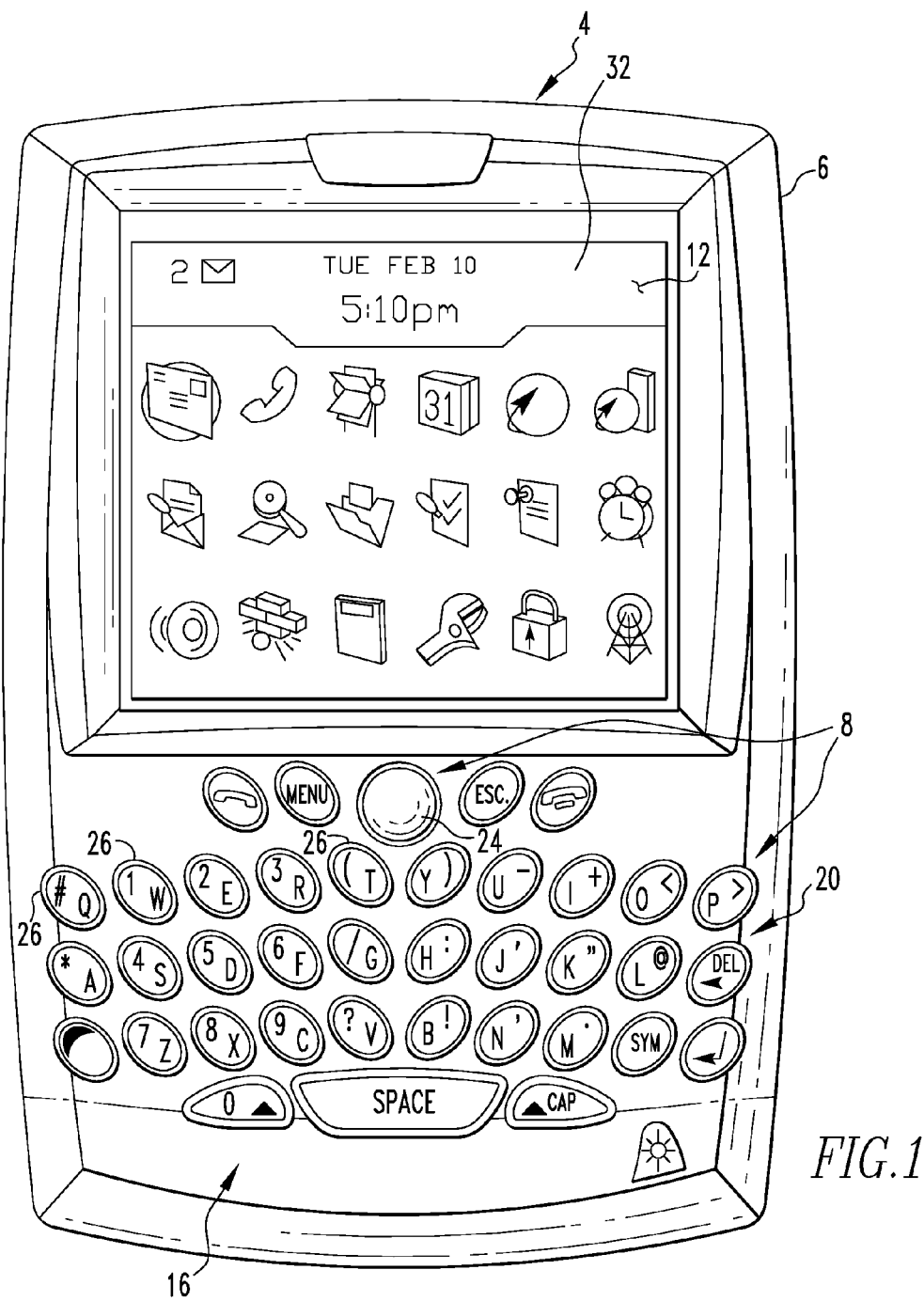
FIG. 1 is a front elevational view of an exemplary handheld electronic device in accordance with the disclosed and claimed concept upon which is performed an improved method in accordance with the disclosed and claimed concept.
Figure 2:
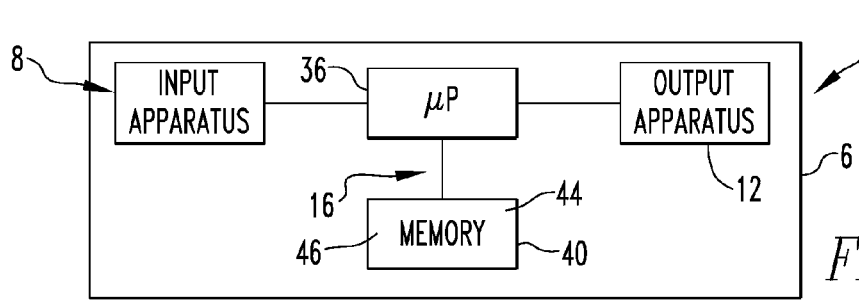
FIG. 2 is a schematic depiction of the handheld electronic device of FIG. 1.

An improved handheld electronic device 4 in accordance with the disclosed and claimed concept is indicated generally in FIG. 1 and is depicted schematically in FIG. 2. The improved handheld electronic device 4 comprises a housing 6 upon which are disposed an input apparatus 8, an output apparatus 12, and a processor apparatus 16. The input apparatus 8 provides input to the processor apparatus 16. The processor apparatus 16 provides output signals to the output apparatus 12.

The input apparatus 8 comprises input members keypad 20 and track ball 24. The keypad 20 in the exemplary embodiment depicted in FIG. 1 comprises a plurality of keys 26 that are each actuatable to provide input to the processor apparatus 16. The track ball 24 is rotatable to provide navigational and other input to the processor apparatus 16, and additionally is translatable in a direction generally inwardly, i.e., toward the housing 6, to provide other input, such as selection inputs and other inputs. The keys 26 and the track ball 24 serve as input members which are actuatable to provide input to the processor apparatus 16. The exemplary output apparatus 12 comprises a display 32.

Examples of other input members not expressly depicted herein would include, for instance, a mouse or joystick for providing navigational inputs, such as could be reflected by movement of a cursor on the display 32, and other inputs such as selection inputs. Still other exemplary input members would include soft buttons of a graphical user interface (GUI), hard buttons disposed on a case of the handheld electronic device 4, and so on. Examples of other output devices would include an audio speaker, LEDs or other light-producing components, and so on.

As shown in FIG. 2, the processor apparatus 16 comprises a processor 36 and a memory 40. The processor 36 may be, for example and without limitation, a microprocessor (μP) that interfaces with the memory 40. The memory 40 can be any one or more of a variety of types of internal and/or external storage media such as, without limitation, RAM, ROM, EPROM(s), EEPROM(s), FLASH, and the like that provide a storage register for data storage such as in the fashion of a machine readable medium or an internal storage area of a computer, and can be volatile memory or nonvolatile memory. The memory 40 has stored therein a number of routines 44 that are executable on the processor 36. As employed herein, the expression "a number of" and variations thereof shall refer broadly to a nonzero quantity, including a quantity of one. The memory 40 further has stored therein or available thereto a dictionary 46 comprising a plurality of words which advantageously include the various accented or diacritical forms of words having the same base characters.

The routines 44 comprise a spell checking routine 44 that is executable on the processor 36 and that performs a spell checking function on text. The text can be received on the handheld electronic device 4 by direct input through the keypad 20, for example, or can be received via an electronic data transfer to the handheld electronic device 4, for example and without limitation. In accordance with the disclosed and claimed concept, the spell checking routine 44 determines whether a currently active input, i.e., a piece of text on the handheld electronic device 4, is possibly misspelled. If it is determined that the active input is at least possibly misspelled, the spell checking routine 44 generates a number of proposed spelling corrections and causes the GUI to output one or more of the proposed spelling corrections on the display 32.

The spell checking routine 44 advantageously provides as preferred proposed spelling corrections those proposed spelling corrections having characters with a logical proximity that is relatively close to the actual input. That is, certain characters are considered to have a logical proximity to one another that is closer than their logical proximity to other characters. For example, the Latin letter "A" can have a base form "A", i.e., a form without any diacritical marks, and can additionally have many diacritical forms such as "À", "Á", "Ã", i.e., the base character plus some type of a diacritical mark. In accordance with the disclosed and claimed concept, the base form of a given character and the various diacritical forms thereof are considered to have a logical proximity to one another that is relatively closer than the logical proximity between any of these characters and the base form or any diacritical form of a different Latin letter. As such, the characters "A" and "À" are considered to have a logical proximity to one another that is closer than their logical proximity to any form of another Latin character, such as "S".

The improved spell checking routine 44 evaluates an active input for possible diacritical errors and/or base character errors. That is, for any given active input, the spell checking routine 44 identifies and can provide as proposed spelling corrections other words having the same base characters as the active input but having one or more diacritical differences thereto, and it also can provide proposed spelling corrections having base characters that are different than those of the active input, whether or not additional diacritical differences exist. As mentioned above, proposed spelling corrections having only diacritical differences from an active input are output as preferred proposed spelling corrections, meaning that they are output at a position of preference or priority to enable easy selection by a user.

Such spell checking and preferencing of diacritically different spelling corrections provides many benefits. One benefit is that the diacritical content of an active input can be evaluated for correctness. As is generally understood, in some languages such as the Italian language, the specific diacritical content of a word can be crucial to the correct spelling of the word and can be necessary for the grammatical correctness of, for example, a sentence, such as where certain accented versions of words are required when appearing at the end of a sentence. For instance, the Italian word "àncora" means "anchor", and the Italian word "ancòra" means "again" or "more". These two Italian words have the same base character but have different diacritical marks. The spell checking routine 44 is advantageously able to distinguish between these two exemplary words having the same base characters but having a number of diacritical differences. In this regard, it is noted that the dictionary 46 would be consulted by the spell checking routine 44 in order to determine that a plurality of different accented versions of a string of base characters exist as separate words.

Another benefit is that the spell checking routine 44 enables a user to enter words having various diacritical forms of characters by typing only the base characters and allowing the spell checking routine 44 to identify and provide as preferred proposed spelling corrections the various accented versions of the input. While on most keyboards all of the various accented forms of characters are available for input, such accented or diacritical forms of characters often can be cumbersome to identify and enter. This drawback is exacerbated in reduced keyboards wherein a plurality of base characters and the associated diacritical forms thereof are associated with a key 26. Enabling the user to enter an accented word by typing only the base characters of the word can save significant time for the user.

An example of the operation of the spell checking routine 44 is indicated generally in FIG. 3. It can be understood that the user has typed <A> <N> <C> <O> <R> <A>, and the processor apparatus 16 has caused the word "ANCORA" to be output on the display 32 as an active input 52. The spell checking routine 44 has advantageously identified a number of proposed spelling corrections 56 that are output on the display 32 in, for example, a list. The spell checking routine 44 has output "ÀNCHORA" as the preferred proposed spelling correction 60 as is indicated by its position at the top of the list of proposed spelling corrections 56. The active input 52 "ANCORA" and the preferred proposed spelling correction 60 "ÀNCORA" have the same base characters but have a diacritical difference in that the preferred proposed spelling correction 60 begins with an accented character, i.e., "À", whereas the active input 52 begins with an unaccented form of the same character, i.e., "A". FIG. 3 depicts the preferred proposed spelling correction 60 as having a highlight 64 applied thereto, meaning that it can be immediately selected upon a predetermined input such as an actuation of an <ENTER> key, a click of the track ball 24, or other appropriate input.

FIG. 3 additional depicts as a first alternate proposed spelling correction 56 the Italian word "ANCÒRA" which has the same base characters as "ANCORA" and "ÀNCORA" but has a number of diacritical differences when compared therewith. A rotation of the track ball 24 a predetermined rotational distance moves the highlight 64 from the preferred proposed spelling correction 60 to the first alternate proposed spelling correction 56, and further such rotations of the track ball 24 move the highlight 64 progressively through the list of proposed spelling corrections 56. Upon detecting a selection input such as an actuation of an <ENTER> key, a click of the track ball 24, etc., the active input 52 will be replaced on the display 32 with the proposed spelling correction 56 that is indicated by the highlight 64. Thus, the first alternate proposed spelling correction 56 "ANCÒRA" could be selected by a single downward scroll of the track ball 24 followed by a selection input.

FIG. 3 additionally depicts as further proposed spelling correction 56 the words "ACHORI" and "ANDORA" which can be seen in the present example to have at least one base character different than the active input 52, the preferred proposed spelling correction 60, and the first alternate proposed spelling correction 56. The two proposed spelling corrections 56 having different base characters than the active input 52 are output at a position of relatively lesser priority or preference than the proposed spelling corrections 56 having at most only diacritical differences from the active input 52.

The priority of output between the preferred proposed spelling correction 60 "ÀNCORA" and the first alternate proposed spelling correction 56 "ANCÒRA" can be resolved by the spell checking routine 44, for example, in accordance with frequency data that might be associated with each of the words and/or through the use of linguistic rules that are applicable to the input situation, i.e., such as when a word at the end of a sentence might be required to have certain accenting whereas it would not be so required if the same word were found elsewhere in the sentence. Other methods of prioritization as contemplated by those skilled in the art can be employed in addition thereto or alternatively.

An exemplary flowchart depicting certain portions of the improved method performed by spell checking routine 44 is shown in FIG. 4. At 204 it is determined whether any word in the dictionary 46 has base characters that match those of the active input 52 but that have at least one diacritical difference. If any such diacritically different words are found, such words are output, as at 208, as preferred proposed spelling corrections. Processing continues thereafter, as at 212, where it is determined whether any word in the dictionary 46 exactly matches the active input 52, meaning that the word in the dictionary 52 has both the same base characters and the same diacritical content as the active input 52. It is noted that if the determination at 204 is negative, i.e., no such word exists in the dictionary 46, processing continues directly to 212.

If it is determined, as at 212, that the dictionary 46 has no exact match for the active input 52, processing continues, as at 216, where proposed spelling corrections 56 having different base characters than the active input 52 are generated and are output. It is noted that any such proposed spelling corrections 56 having different base characters than the active input 52 would be output at a position of relatively lower priority, i.e., lower preference, than any words that are output at 208 as having the same base characters but different diacritical content. The priority of output of the proposed spelling corrections 56 having base characters different than the active input 52 can be resolved by the spell checking routine 44 through the use of frequency data and/or through the use of linguistic rules, for example, but will always be output at a position of relatively lower priority or preference with respect to proposed spelling corrections 56 having only diacritical differences from the active input 52. It is noted that the proposed spelling corrections 56 that are output at 216 can additionally have various diacritical differences from the active input 52.

Processing thereafter continues, as at 220, where it is determined whether any proposed spelling corrections 56 were generated with respect to the active input 52, such as at 208 and/or 216. It is noted that processing will continue from 212 directly to 220 if it is determined at 212 that the dictionary 46 contains a word that exactly matches the active input 52. If it is determined at 220 that no proposed spelling corrections were generated with respect to the active input 52, such as at 208 and/or 216, processing continues as at 228 where the spell checking routine 44 moves to the next input for analysis. This means that the next input, i.e., the next word in the quantity of text being analyzed, is made the new active input 52, and processing thereafter continues, as at 204 with respect to the new active input 52.

If, however, it is determined at 220 that one or more proposed spelling corrections 56 were generated, processing continues, as at 224, where the spell checking routine 44 waits for an input by the user. Such an input likely would be either a selection input selecting one of the proposed spelling corrections 56 to replace the active input 52, or would be an <IGNORE> input, such as might be provided by an actuation of an <ESCAPE> key or other appropriate input. Processing would thereafter continue to 228 where the sequentially next input would be made the new active input 52, and processing would thereafter continue, as at 204.

It thus can be seen that the improved spell checking routine 44 outputs at a position of preference, i.e., priority, certain proposed spelling corrections 56 having a relatively close logical proximity to the active input 52. The preferential positioning of such proposed spelling corrections 56 facilitates their selection by the user. Moreover, the improved spell checking routine 44 advantageously enables words having diacritical content to be input by typing only the base forms of the various letters of the word and by allowing the spell checking routine 44 to identify and output the various accented versions of the typed word for selection by the user.

Figure 5:
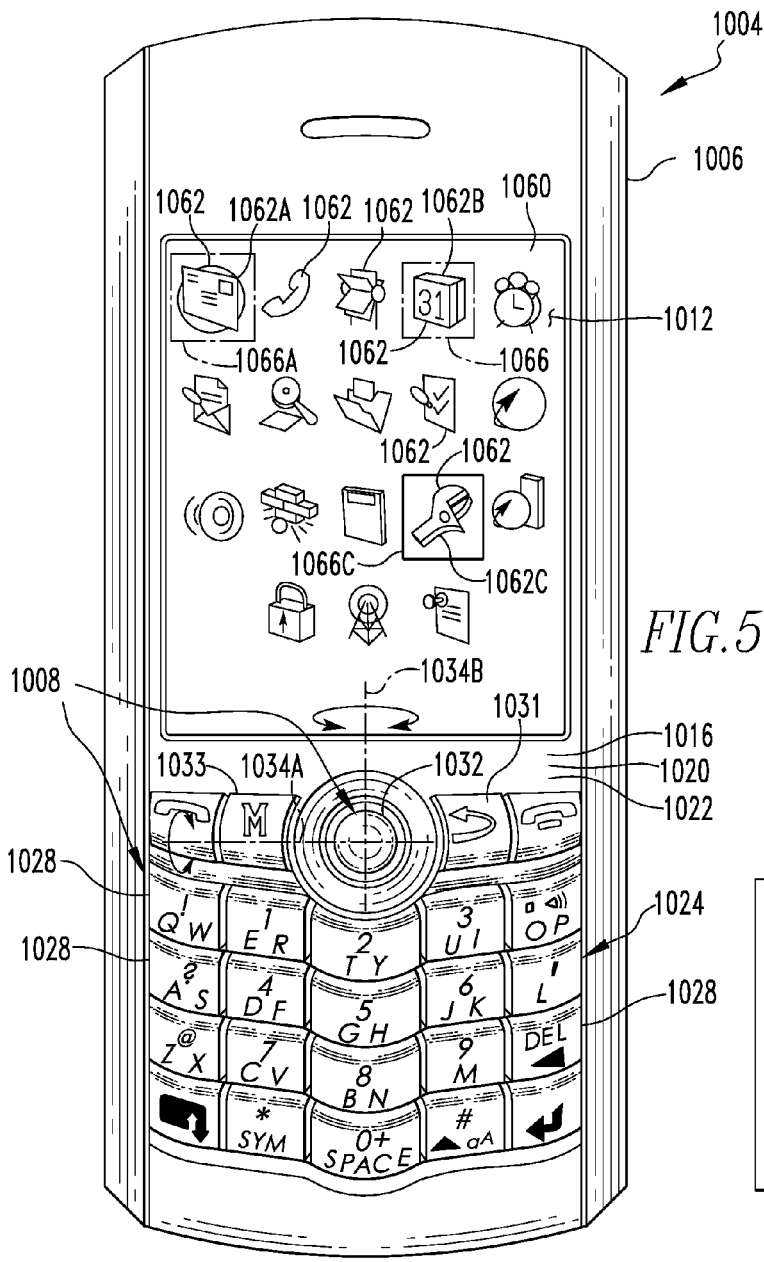
FIG. 5 is a top plan view of an improved handheld electronic device in accordance with another embodiment of the disclosed and claimed concept.

An improved handheld electronic device 1004 in accordance with another embodiment of the disclosed and claimed concept is depicted generally in FIG. 5. As a general matter, the handheld electronic device 1004 is substantially identical in configuration and function to the handheld electronic device 4, except that the handheld electronic device 1004 employs an input apparatus 1008 that is different than the input apparatus 8. Specifically, the input apparatus 1008 employs a keypad 1024 wherein many of its keys 1028 have a plurality of base characters, i.e., linguistic elements, assigned thereto. The handheld electronic device 1004 therefore has a disambiguation routine that is executable thereon to interpret keystrokes as text inputs, for example. Moreover, the input apparatus 1008 employs a multiple-axis input device instead of or in addition to the track ball 24.

In the depicted exemplary embodiment, the multiple-axis input device is a track ball 1032, as will be described below. It is noted, however, that multiple-axis input devices other than the track ball 1032 can be employed without departing from the present concept. For instance, other appropriate multiple-axis input devices could include mechanical devices such as joysticks and the like and/or non-mechanical devices such as touch pads, track pads and the like, and/or other devices which detect motion or input in other fashions, such as through the use of optical sensors or piezoelectric crystals.

The handheld electronic device 1004 includes a housing 1006 upon which is disposed a processor unit that includes the input apparatus 1008, an output apparatus 1012, a processor 1016, a memory 1020, and a number of routines 1022 including the disambiguation routine. All of the operations that can be performed on or with the handheld electronic device 4 can be performed on or with the handheld electronic device 1004. As such, the features of the handheld electronic device 4 that are common with the handheld electronic device 1004, and this would comprise essentially all of the features of the handheld electronic device 4, will generally not be repeated.

The output apparatus 1012 includes a display 1060 that provides visual output. The exemplary output in FIG. 5 is a plurality of icons 1062 that are selectable by the user for the purpose of, for example, initiating the execution on the processor 1016 of a routine 1022 that is represented by an icon 1062.

The input apparatus 1008 can be said to comprise the keypad 1024 and the track ball 1032, all of which serve as input members. The keypad 1024 and the track ball 1032 are advantageously disposed adjacent one another. The keypad 1024 comprises a plurality of the keys 1028, and the keys 1028 are actuatable to provide input to the processor 1016. As mentioned above, many of the keys 1028 have assigned thereto a plurality of base characters, i.e., linguistic elements, in the exemplary form of Latin letters. Other keys 1028 can have assigned thereto functions and/or other characters.

For instance, one of the keys 1028 is an <ESCAPE> key 1031 which, when actuated, provides to the processor 1016 an input that undoes the action which resulted from the immediately preceding input and/or moves the user to a logically higher position within the logical menu tree managed by a graphical user interface (GUI) routine 1022. The function provided by the <ESCAPE> key 1031 can be used at any logical location within any portion of the logical menu tree except, perhaps, at a home screen such as is depicted in FIG. 5. The <ESCAPE> key 1031 is advantageously disposed adjacent the track ball 1032 thereby enabling, for example, an unintended or incorrect input from the track ball 1032 to be quickly undone, i.e., reversed, by an actuation of the adjacent <ESCAPE> key 1031.

Figure 6:
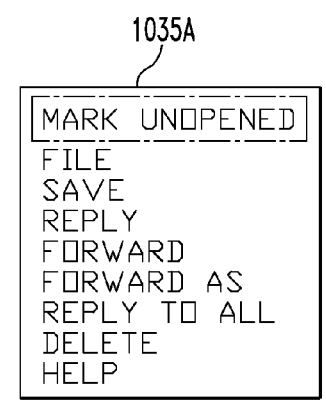
FIG. 6 depicts an exemplary menu that can be output on the handheld electronic device of FIG. 5.
Figure 7:
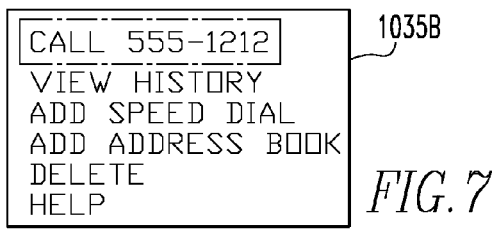
FIG. 7 depicts another exemplary menu.

Another of the keys 1028 is a <MENU> key 1033 which, when actuated, provides to the processor 1016 an input that causes the GUI 1022 to generate and output on the display 1060 a menu that is appropriate to the user's current logical location within the logical menu tree. For instance, FIG. 6 depicts an exemplary menu 1035A that would be appropriate if the user's current logical location within the logical menu tree was viewing an email within an email routine 1022. That is, the menu 1035A provides selectable options that would be appropriate for a user given that the user is, for example, viewing an email within an email routine 1022. In a similar fashion, FIG. 7 depicts another exemplary menu 1035B that would be depicted if the user's current logical location within the logical menu tree was within a telephone routine 1022.

The track ball 1032 is disposed on the housing 1006 and is freely rotatable in all directions with respect to the housing 1006. A rotation of the track ball 1032 a predetermined rotational distance with respect to the housing 1006 provides an input to the processor 1016, and such inputs can be employed by the routines 1022, for example, as navigational inputs, scrolling inputs, selection inputs, and other inputs.

For instance, the track ball 1032 is rotatable about a horizontal axis 1034A to provide vertical scrolling, navigational, selection, or other inputs. Similarly, the track ball 1032 is rotatable about a vertical axis 1034B to provide horizontal scrolling, navigational, selection, or other inputs. Since the track ball 1032 is freely rotatable with respect to the housing 1006, the track ball 1032 is additionally rotatable about any other axis (not expressly depicted herein) that lies within the plane of the page of FIG. 5 or that extends out of the plane of the page of FIG. 5.

The track ball 1032 can be said to be a multiple-axis input device because it provides scrolling, navigational, selection, and other inputs in a plurality of directions or with respect to a plurality of axes, such as providing inputs in both the vertical and the horizontal directions. It is reiterated that the track ball 1032 is merely one of many multiple-axis input devices that could be employed on the handheld electronic device 1004. As such, mechanical alternatives to the track ball 1032, such as a joystick, might have a limited rotation with respect to the housing 1006, and non-mechanical alternatives might be immovable with respect to the housing 1006, yet all are capable of providing input in a plurality of directions or along a plurality of axes.

The track ball 1032 additionally is translatable toward the housing 1006, i.e., into the plane of the page of FIG. 5, to provide additional inputs. The track ball 1032 could be translated in such a fashion by, for example, a user applying an actuating force to the track ball 1032 in a direction toward the housing 1006, such as by pressing on the track ball 1032. The inputs that are provided to the processor 1016 as a result of a translation of the track ball 1032 in the indicated fashion can be employed by the routines 1022, for example, as selection inputs, delimiter inputs, or other inputs.

The track ball 1032 is rotatable to provide, for example, navigational inputs among the icons 1062. For example, FIG. 5 depicts the travel of an indicator 1066 from the icon 1062A, as is indicated in broken lines with the indicator 1066A, to the icon 1062B, as is indicated in broken lines with the indicator 1066B, and onward to the icon 1062C, as is indicated by the indicator 1066C. It is understood that the indicators 1066A, 1066B, and 1066C are not necessarily intended to be simultaneously depicted on the display 1060, but rather are intended to together depict a series of situations and to indicate movement of the indicator 1066 among the icons 1062. The particular location of the indicator 1066 at any given time indicates to a user the particular icon 1062, for example, that is the subject of a selection focus of the handheld electronic device 1004. Whenever an icon 1062 or other selectable object is the subject of the selection focus, a selection input to the processor 1016 will result in the routine 1022 or other function represented by the icon 1062 or other selectable object to be executed or initiated.

The movement of the indicator 1066 from the icon 1062A, as indicated with the indicator 1066A, to the icon 1062B, as is indicated by the indicator 1066B, was accomplished by rotating the track ball 1032 about the vertical axis 1034B to provide a horizontal navigational input. As mentioned above, a rotation of the track ball 1032 a predetermined rotational distance results in an input to the processor 1016. In the present example, the track ball 1032 would have been rotated about the vertical axis 1034B a rotational distance equal to three times the predetermined rotational distance since the icon 1062B is disposed three icons 1062 to the right the icon 1062A. Such rotation of the track ball 1032 likely would have been made in a single motion by the user, but this need not necessarily be the case.

Similarly, the movement of the indicator 1066 from the icon 1062B, as indicated by the indicator 1066B, to the icon 1062C, as is indicated by the indicator 1066C, was accomplished by the user rotating the track ball 1032 about the horizontal axis 1034A to provide a vertical navigational input. In so doing, the track ball 1032 would have been rotated a rotational distance equal to two times the predetermined rotational distance since the icon 1062C is disposed two icons 1062 below the icon 1062B. Such rotation of the track ball 1032 likely would have been made in a single motion by the user, but this need not necessarily be the case.

It thus can be seen that the track ball 1032 is rotatable in various directions to provide various navigational and other inputs to the processor 1016. Rotational inputs by the track ball 1032 typically are interpreted by whichever routine 1022 is active on the handheld electronic device 1004 as inputs that can be employed by such routine 1022. For example, the GUI 1022 that is active on the handheld electronic device 1004 in FIG. 5 requires vertical and horizontal navigational inputs to move the indicator 1066, and thus the selection focus, among the icons 1062. If a user rotated the track ball 1032 about an axis oblique to the horizontal axis 1034A and the vertical axis 1034B, the GUI 1022 likely would resolve such an oblique rotation of the track ball 1032 into vertical and horizontal components which could then be interpreted by the GUI 1022 as vertical and horizontal navigational movements, respectively. In such a situation, if one of the resolved vertical and horizontal navigational movements is of a greater magnitude than the other, the resolved navigational movement having the greater magnitude would be employed by the GUI 1022 as a navigational input in that direction to move the indicator 1066 and the selection focus, and the other resolved navigational movement would be ignored by the GUI 1022, for example.

When the indicator 1066 is disposed on the icon 1062C, as is indicated by the indicator 1066C, the selection focus of the handheld electronic device 1004 is on the icon 1062C. As such, a translation of the track ball 1032 toward the housing 1006 as described above would provide an input to the processor 1016 that would be interpreted by the GUI 1022 as a selection input with respect to the icon 1062C. In response to such a selection input, the processor 1016 would, for example, begin to execute a routine 1022 that is represented by the icon 1062C. It thus can be understood that the track ball 1032 is rotatable to provide navigational and other inputs in multiple directions, assuming that the routine 1022 that is currently active on the handheld electronic device 1004 can employ such navigational or other inputs in a plurality of directions, and can also be translated to provide a selection input or other input.

Rotational movement inputs from the track ball 1032 could be employed to navigate among, for example, the menus 1035A and 1035B. For instance, after an actuation of the <MENU> key 1033 and an outputting by the GUI 1022 of a resultant menu, the user could rotate the track ball 1032 to provide scrolling inputs to successively highlight the various selectable options within the menu. Once the desired selectable option is highlighted, i.e., is the subject of the selection focus, the user could translate the track ball 1032 toward the housing 1006 to provide a selection input as to the highlighted selectable option. In this regard, it is noted that the <MENU> key 1033 is advantageously disposed adjacent the track ball 1032. This enables, for instance, the generation of a menu by an actuation the <MENU> key 1033, conveniently followed by a rotation the track ball 1032 to highlight a desired selectable option, for instance, followed by a translation of the track ball 1032 toward the housing 1006 to provide a selection input to initiate the operation represented by the highlighted selectable option.

It is further noted that one of the additional inputs that can be provided by a translation of the track ball 1032 is an input that causes the GUI 1022 to output a reduced menu. For instance, a translation of the track ball 1032 toward the housing 1066 could result in the generation and output of a more limited version of a menu than would have been generated if the <MENU> key 1033 had instead been actuated. Such a reduced menu would therefore be appropriate to the user's current logical location within the logical menu tree and would provide those selectable options which the user would have a high likelihood of selecting. Rotational movements of the track ball 1032 could provide scrolling inputs to scroll among the selectable options within the reduced menu 1035C, and translation movements of the track ball 1032 could provide selection inputs to initiate whatever function is represented by the selectable option within the reduce menu 1032 that is currently highlighted.

Figure 8:
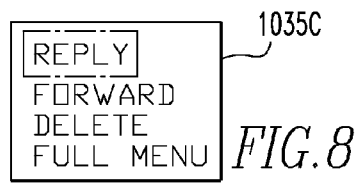
FIG. 8 depicts an exemplary reduced menu.

By way of example, if instead of actuating the <MENU> key 1033 to generate the menu 1035A the user translated the track ball 1032, the GUI 1022 would generate and output on the display the reduced menu 1035C that is depicted generally in FIG. 8. The exemplary reduced menu 1035C provides as selectable options a number of the selectable options from the menu 1035A that the user would be most likely to select.

As such, a user seeking to perform a relatively routine function could, instead of actuating the <MENU> key 1033 to display the full menu 1035A, translate the track ball 1032 to generate and output the reduced menu 1035C. The user could then conveniently rotate the track ball 1032 to provide scrolling inputs to highlight a desired selectable option, and could then translate the track ball 1032 to provide a selection input which would initiate the function represented by the selectable option in the reduced menu 1035C that is currently highlighted.

In the present exemplary embodiment, many of the menus that could be generated as a result of an actuation of the <MENU> key 1033 could instead be generated and output in reduced form as a reduced menu in response to a translation of the track ball 1032 toward the housing 1006. It is noted, however, that a reduced menu might not be available for each full menu that could be generated from an actuation of the <MENU> key 1033. Depending upon the user's specific logical location within the logical menu tree, a translation of the track ball 1032 might be interpreted as a selection input rather than an input seeking a reduced menu. For instance, a translation of the track ball 1032 on the home screen depicted in FIG. 5 would result in a selection input as to whichever of the icons 1062 is the subject of the input focus. If the <MENU> key 1033 was actuated on the home screen, the GUI 1022 would output a menu appropriate to the home screen, such as a full menu of all of the functions that are available on the handheld electronic device 1004, including those that might not be represented by icons 1062 on the home screen.

Figure 9:
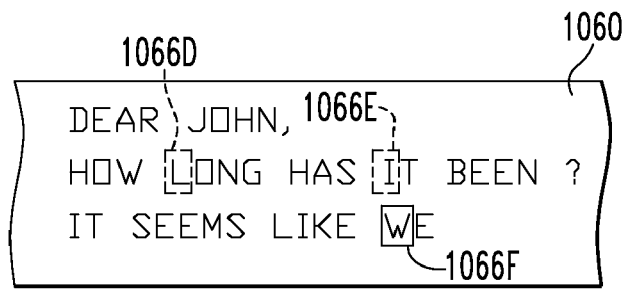
FIG. 9 is an exemplary output such as could occur during a text entry or text editing operation.

FIG. 9 depicts a quantity of text that is output on the display 1060, such as during a text entry operation or during a text editing operation, for example. The indicator 1066 is depicted in FIG. 9 as being initially over the letter "L", as is indicated with the indicator 1066D, and having been moved horizontally to the letter "I", as is indicated by the indicator 1066E, and thereafter vertically moved to the letter "W", as is indicated by the indicator 1066F. In a fashion similar to that in FIG. 5, the cursor 1066 was moved among the letters "L", "I", and "W" through the use of horizontal and vertical navigational inputs resulting from rotations of the track ball 1032. In the example of FIG. 9, however, each rotation of the track ball 1032 the predetermined rotational distance would move the indicator 1066 to the next adjacent letter. As such, in moving the indicator 1066 between the letters "L" and "I," the user would have rotated the track ball 1032 about the vertical axis 1034B a rotational distance equal to nine times the predetermined rotational distance, for example, since "I" is disposed nine letters to the right of "L".

Figure 10:
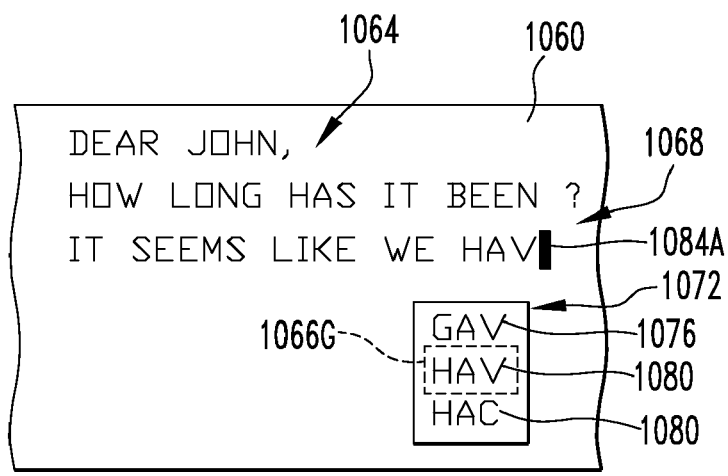
FIG. 10 is an exemplary output during a text entry operation.

FIG. 10 depicts an output 1064 on the display 1060 during, for example, a text entry operation that employs the disambiguation routine 1022. The output 1064 can be said to comprise a text component 1068 and a variant component 1072. The variant component 1072 comprises a default portion 1076 and a variant portion 1080. FIG. 10 depicts the indicator 1066G on the variant 1080 "HAV", such as would result from a rotation of the track ball 1032 about the horizontal axis 1034A to provide a downward vertical scrolling input. In this regard, it is understood that a rotation of the track ball 1032 a distance equal to the predetermined rotational distance would have moved the indicator 1066 from a position (not expressly depicted herein) disposed on the default portion 1076 to the position disposed on the first variant 1080, as is depicted in FIG. 10. Since such a rotation of the track ball 1032 resulted in the first variant 1080 "HAV" being highlighted with the indicator 1066G, the text component 1068 likewise includes the text "HAV" immediately preceding a cursor 1084A.

Figure 11:
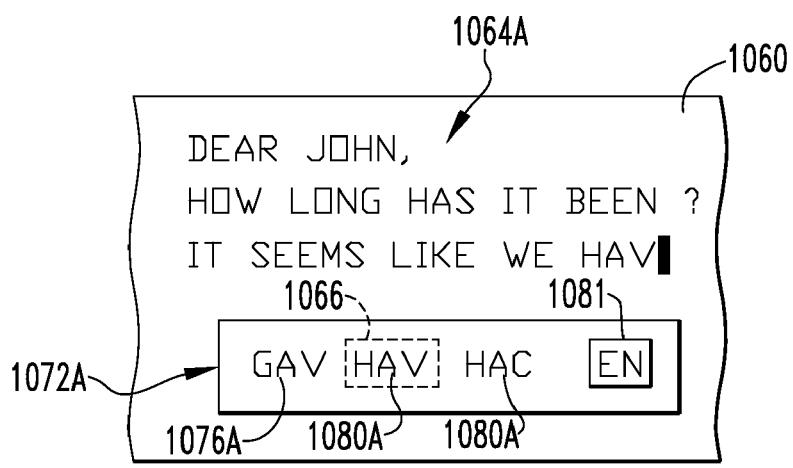
FIG. 11 is an alternative exemplary output during a text entry operation.

FIG. 11 depict an alternative output 1064A having an alternative variant component 1072A having a default portion 1076A and a variant portion 1080A. The variant component 1072A is horizontally arranged, meaning that the default portion 1076A and the variants 1080A are disposed horizontally adjacent one another and can be sequentially selected by the user through the use of horizontal scrolling inputs, such as by the user rotating the track ball 1032 the predetermined rotational distance about the vertical axis 1034B. This is to be contrasted with the variant component 1072 of FIG. 10 wherein the default portion 1076 and the variants 1080 are vertically arranged, and which can be sequentially selected by the user through the user of vertical scrolling inputs with the track ball 1032.

In this regard, it can be understood that the track ball 1032 can provide both the vertical scrolling inputs employed in conjunction with the output 1064 as well as the horizontal scrolling inputs employed in conjunction with the output 1064A. For instance, the disambiguation routine 1022 potentially could allow the user to customize the operation thereof by electing between the vertically arranged variant component 1072 and the horizontally arranged variant component 1072A. The track ball 1032 can provide scrolling inputs in the vertical direction and/or the horizontal direction, as needed, and thus is operable to provide appropriate scrolling inputs regardless of whether the user chooses the variant component 1072 or the variant component 1072A. That is, the track ball 1032 can be rotated about the horizontal axis 1034A to provide the vertical scrolling inputs employed in conjunction with the variant component 1072, and also can be rotated about the vertical axis 1034B to provide the horizontal scrolling inputs that are employed in conjunction with the variant component 1064A. The track ball 1032 thus could provide appropriate navigational, strolling, selection, and other inputs depending upon the needs of the routine 1022 active at any time on the handheld electronic device 1004. The track ball 1032 enables such navigational, strolling, selection, and other inputs to be intuitively generated by the user through rotations of the track ball 1032 in directions appropriate to the active routine 1022, such as might be indicated on the display 1060. Other examples will be apparent.

It can further be seen from FIG. 11 that the variant component 1072A additionally includes a value 1081 that is indicative of the language into which the disambiguation routine 1022 will interpret ambiguous text input. In the example depicted in FIG. 11, the language is English.

Figure 12:
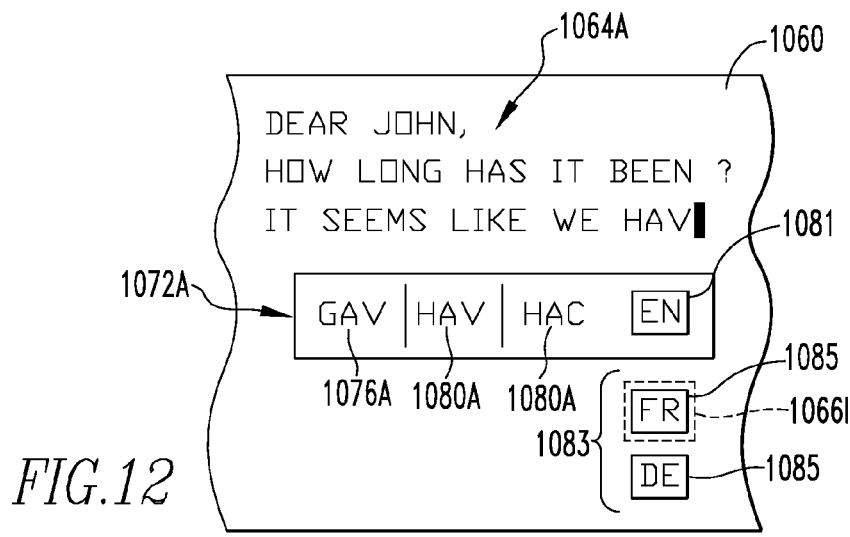
FIG. 12 is another exemplary output during a part of text entry operation.

As can be seen in FIG. 12, the value 1081 can be selected by the user to cause the displaying of a list 1083 of alternative values 1085. The alternative values 1085 are indicative of selectable alternative languages into which the disambiguation routine 1022 can interpret ambiguous input. A selection of the value 1081 would have been achieved, for example, by the user providing horizontal scrolling inputs with the track ball 1032 to cause (not expressly depicted herein) the indicator 1066 to be disposed over the value 1081, and by thereafter translating the track ball 1032 toward the housing 1006 to provide a selection input.

The alternative values 1085 in the list 1083 are vertically arranged with respect to one another and with respect to the value 1081. As such, a vertical scrolling input with the track ball 1032 can result in a vertical movement of the indicator 1066I to a position on one of the alternative values 1085 which, in the present example, is the alternative value 1085 "FR", which is representative of the French language. The alternative value 1085 "FR" could become selected by the user in any of a variety of fashions, such as by actuating the track ball 1032 again, by continuing to enter text, or in other fashions. It thus can be understood from FIG. 11 and FIG. 12 that the track ball 1032 can be rotated to provide horizontal scrolling inputs and, when appropriate, to additionally provide vertical scrolling inputs and, when appropriate, to additionally provide selection inputs, for example.

Figure 13:
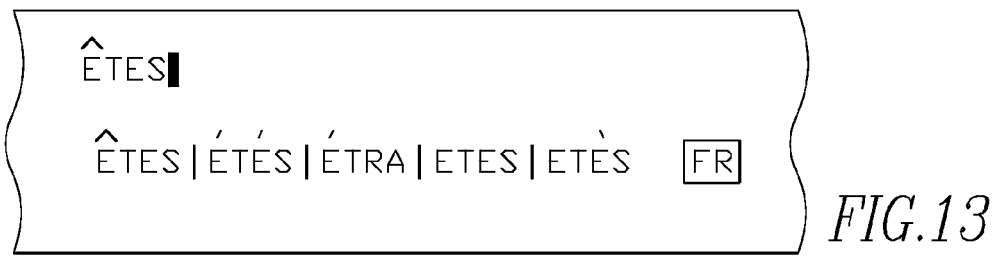
FIG. 13 is another exemplary output during a part of another text entry operation.

A selection in such a fashion of an alternate input language such as the French language will result in the generation and outputting of disambiguation results that include diacritical forms of characters that are appropriate to the language. For instance, and as can be seen in FIG. 13, in response to the ambiguous input <ER><TY><ER><AS> the disambiguation routine generates and causes the outputting of proposed disambiguations such as "ÊTES", "ÉTES", "ÉTRA", and "ETES", all of which are appropriate to the French language. It can be seen that the non-diacritical "ETES" is actually the fourth proposed output, meaning that three proposed disambiguations having diacritical content are preferred over the non-diacritical "ETES". In such an exemplary situation, therefore, the user is able to type the non-diacritical ambiguous input <ER><TY><ER><AS> and is easily able to choose among three or more diacritical disambiguations thereof by providing inputs with the track wheel 1032. This advantageously facilitates input.

Figure 14:
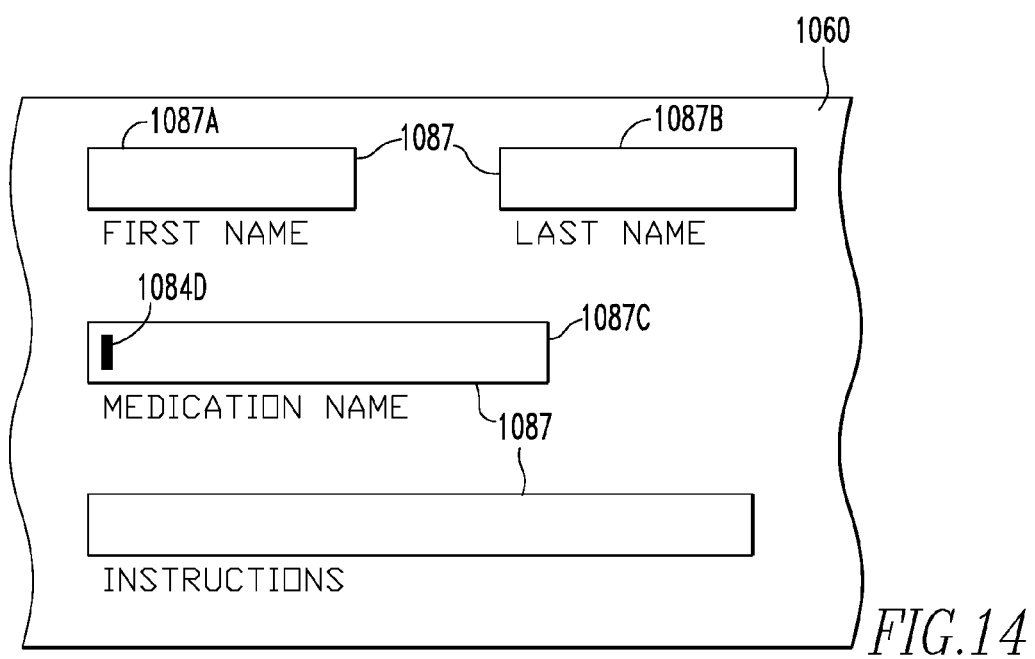
FIG. 14 is an exemplary output during a data entry operation.

FIG. 14 depicts another exemplary output on the display 1060 such as might be employed by a data entry routine 1022. The exemplary output of FIG. 14 comprises a plurality of input fields 1087 with corresponding descriptions. A cursor 1084D, when disposed within one of the input fields 1087, indicates to the user that an input focus of the handheld electronic device 1004 is on that input field 1087. That is, data such as text, numbers, symbols, and the like, will be entered into whichever input field 1087 is active, i.e., is the subject of the input focus. It is understood that the handheld electronic device 1004 might perform other operations or take other actions depending upon which input field 1087 is the subject of the input focus.

Navigational inputs from the track ball 1032 advantageously enable the cursor 1084D, and thus the input focus, to be switched, i.e., shifted, among the various input fields 1087. For example, the input fields 1087 could include the input fields 1087A, 1087B, and 1087C. FIG. 14 depicts the cursor 1084D as being disposed in the input field 1087C, indicating that the input field 1087C is the subject of the input focus of the handheld electronic device 1004. It is understood that the cursor 1084D, and thus the input focus, can be shifted from the input field 1087C to the input field 1087A, which is disposed adjacent and vertically above the input field 1087C, by providing a vertical scrolling input in the upward direction with the track ball 1032. That is, the track ball 1032 would be rotated the predetermined rotational distance about the horizontal axis 1034. Similarly, the cursor 1084D, and thus the input focus, can be shifted from the input field 1087A to the input field 1087B, which is disposed adjacent and to the right of the input field 1087A, by providing a horizontal scrolling input to the right with the track ball 1032. That is, such a horizontal scrolling input could be provided by rotating the track ball the predetermined rotational distance about the vertical axis 1034B. It thus can be seen that the track ball 1032 is rotatable in a plurality of directions about a plurality axes to provide navigational, scrolling, and other inputs in a plurality of directions among a plurality of input fields 1087. Other types of inputs and/or inputs in other applications will be apparent.

Since the keypad 1024 and the track ball 1032 are advantageously disposed adjacent one another, the user can operate the track ball 1032 substantially without moving the user's hands away from the keypad 1024 during a text entry operation or other operation.

Figure 15:
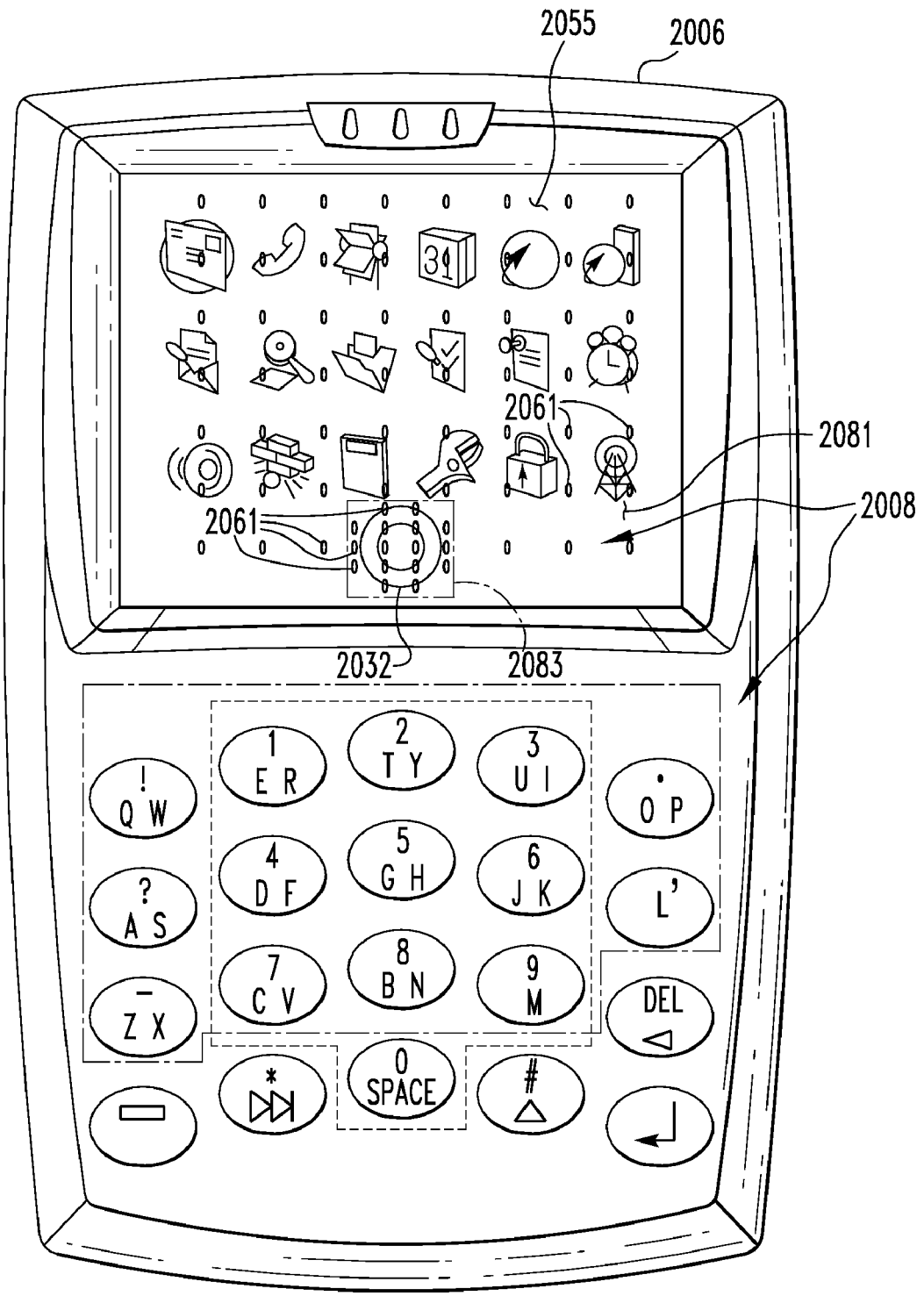
FIG. 15 is a top plan view of an improved handheld electronic device in accordance with still another embodiment of the disclosed and claimed concept.
Figure 16:
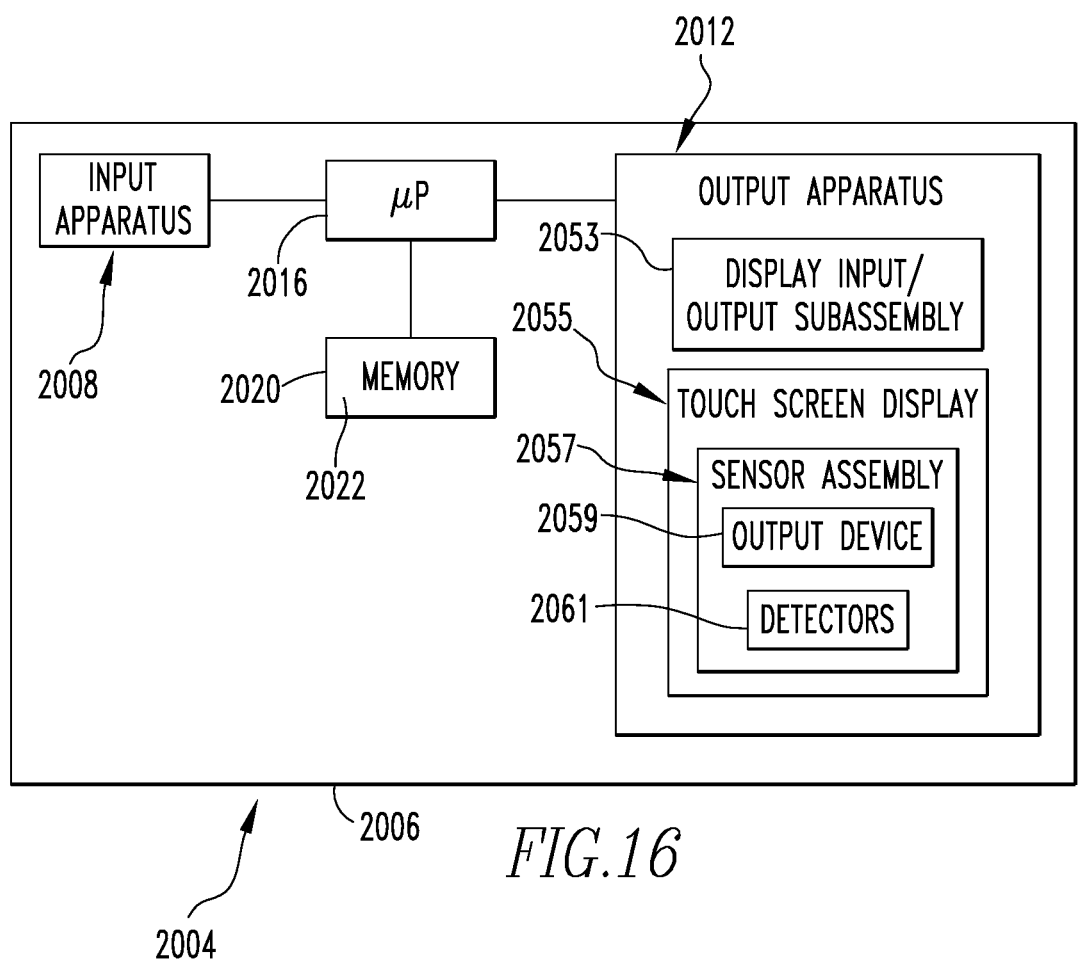
FIG. 16 is a schematic depiction of the improved handheld electronic device of FIG. 15.

An improved handheld electronic device 2004 in accordance with still another embodiment of the disclosed and claimed concept is depicted generally in FIG. 15 and FIG. 16. The handheld electronic device 2004 includes a housing 2006 upon which is disposed a processor unit that includes an input apparatus 2008, an output apparatus 2012, a processor 2016, a memory 2020, and a number of routines 2022. All of the operations that can be performed on or with the handheld electronic devices 4 and/or 1004 can be performed on or with the handheld electronic device 2004. As such, the features of the handheld electronic device 2004 that are common with the handheld electronic devices 4 and/or 1004, and this would comprise essentially all of the features of the handheld electronic devices 4 and/or 1004, will generally not be repeated.

As a general matter, the handheld electronic device 2004 is substantially identical in configuration and function to the handheld electronic device 1004, except that the handheld electronic device 2004 includes a touch screen display 2055 that provides a non-mechanical multiple-axis input device 2032 instead of the track ball 1032. The multiple-axis input device 2032 can be said to be in the form of a virtual track ball 2032.

As is generally understood, the touch screen display 2055 includes a liquid crystal layer between a pair of substrates, with each substrate including an electrode. The electrodes form a grid which defines the aperture size of the pixels. When a charge is applied to the electrodes, the liquid crystal molecules of the liquid crystal layer become aligned generally perpendicular to the two substrates. A display input/output subassembly 2053 of the output apparatus 2012 controls the location of the charge applied to the electrodes thereby enabling the formation of images on the touch screen display 2055.

Additionally, the touch screen display 2055 comprises a sensor assembly 2057 which comprises an output device 2059 and a plurality of detectors 2061. The detectors 2061 are shown schematically and are typically too small to be seen by the naked eye. Each detector 2061 is in electrical communication with the output device 2059 and creates an output signal when actuated. The detectors 2061 are disposed in a pattern, discussed below, and are structured to detect an external object immediately adjacent to, or touching, the touch screen display 2055. The external object is typically a stylus or a user's finger (not shown). The output device 2059 and/or the processor 2016 are structured to receive the detector signals and convert the signals to data representing the location of the external object relative to the touch screen display 2055. As such, while the sensor assembly 2057 is physically a component of the touch screen display 2055, it is nevertheless considered to be a logical component of the input apparatus 2008 since it provides input to the processor apparatus.

The detectors 2061 are typically capacitive detectors, optical detectors, resistive detectors, or mechanical detectors such as strain gauge or charged grid, although other technologies may be employed without departing from the present concept. Typically, capacitive detectors are structured to detect a change in capacitance caused by the electrical field of the external object or a change in capacitance caused by the compression of the capacitive detector. Optical detectors are structured to detect a reflection of light, e.g., light created by the touch screen display 2055. Mechanical detectors include a charged grid with columns that would be disposed on one side of the touch screen display 2055 and a corresponding grid without columns would be disposed at another location on the touch screen display 2055. In such a configuration, when the touch screen display 2055 is compressed, i.e. as a result of being touched by the user, the columns at the area of compression contact the opposing grid thereby completing a circuit.

Capacitive detectors may be disposed upon either substrate and, although small, require space. Thus, and any pixel that is disposed adjacent a detector 2061 will have a reduced size, or aperture, to accommodate the adjacent detector 2061.

The detectors 2061 are disposed in a pattern, and at least some of the detectors 2061 preferably are arranged in lines that form a grid. A first portion of the detectors 2061 are disposed on a first area 2081 of the touch screen display 2055, and a second portion of the detectors 2061 are disposed on a second area 2083 of the touch screen display 2055. As can be seen from FIG. 15, the first area 2081 essentially is every region of the touch screen display 2005 other than the second area 2083.

The first portion of the detectors 2061 disposed on the first area 2081 of the touch screen display 2055 are disposed in a relatively sparse pattern in order to minimize the visual interference that is caused by the presence of the detectors 2061 adjacent the pixels. Preferably, the spacing of the detectors 2061 on the first area 2081 is between about 1.0 mm and 10.0 mm between the detectors 2061, and more preferably about 3.0 mm between the detectors 2061.

The second portion of the detectors 2061 are disposed in a relatively dense pattern on the second area 2083 of the touch screen display 2055 and are structured to support the function of the virtual track ball 2032. The image quality in the second area 2083 of the touch screen display 2055 is adversely affected due to the dense spacing of the detectors 2061 there. However, the second area 2083 is a relatively small area compared to the entire touch screen display 2055. Preferably, the density of the detectors 2061 in the second area 2083 is between about 0.05 mm and 3.0 mm between the detectors, and more preferably about 0.1 mm between the detectors 2061. Further, because the pixels in the second area 2083 are dedicated for the virtual track ball 2032, it is acceptable to have a reduced pixel density with larger pixels. Since the pixel size would be very large, the aspect ratio would be significantly higher than that of pixels that are not disposed adjacent a detector 2061. The pixels in the second area 2083 likely would be special function pixels, such as pixels that would both depict the virtual track ball 2032 and that would light up the second area 2083 to highlight the virtual track ball 2032.

The processor apparatus is structured to create images and define the boundaries of selectable portions of the images on the touch screen display 2055. For example, the processor apparatus will create the images of selectable icons or other objects on specific portions of the touch screen display 2055. The processor apparatus is further structured to relate specific detectors 2061 to the specific portions of the touch screen display 2055. Thus, when the processor apparatus detects the actuation of a specific detector 2061 adjacent to a specific image, e.g. a selectable icon, the processor apparatus will initiate the function or routine related to that icon, e.g. opening a calendar program.

Similarly, the processor apparatus is structured to employ specific detectors 2061 to support the function of the virtual track ball 2032 in the second area 2083 of the touch screen display 2055. Thus, actuations of one or more of the detectors 2061 that support the virtual track ball 2032 will be interpreted by the processor apparatus as being inputs from the virtual track ball 2032. For instance, an actuation of a sequential plurality of detectors 2061 extending along a particular direction on the touch screen display 2055 in the second area 2083 might be interpreted as a navigational input, a scrolling input, a selection input, and/or another input in the particular direction. Since the user can freely move a finger, for instance, in any direction on the touch screen display 2055, the virtual track ball 2032 is a multiple-axis input device. Other inputs, such as a non-moving actuation of one or more detectors 2061 in the central region of the virtual track ball 2032 could be interpreted by the processor apparatus as an actuation input of the virtual track ball 2032, such as would be generated by an actuation of the track ball 1032 of the handheld electronic device 1004 in a direction toward the housing 1006 thereof. It can be understood that other types of actuations of the detectors 2061 in the second area 2083 can be interpreted as various other inputs without departing from the disclosed and claimed concept.

The handheld electronic device 2004 thus comprises a multiple-axis input device 2032 that is non-mechanical but that still provides the same functional features and advantages as, say, the track ball 1032 of the handheld electronic device 1004. It is understood that the virtual track ball 2032 is but one example of the many types of multiple-axis input devices that could be employed on the handheld electronic device 2004.

While specific embodiments of the disclosed and claimed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed and claimed concept which is to be given the full breadth of the claims appended and any and all equivalents thereof.

What is claimed is:

1. A method of enabling input on an electronic device comprising a processor, the method comprising:
    determining, using the processor, that a text input is at least possibly misspelled, the text input comprising one of a diacritical form and a non-diacritical form of each of a number of characters;
    generating, using the processor, a number of proposed spelling corrections of the text input comprising a first proposed spelling correction comprising the number of characters of the text input but having at least one diacritical difference therefrom and a second proposed spelling correction comprising at least one base character difference from the number of characters of the text input;
    outputting the number of proposed spelling corrections of the text input; and
    providing the first proposed spelling correction as a preferred proposed spelling correction over the second proposed spelling correction, the at least one diacritical difference comprising at least one of:
        the text input having a non-diacritical form of a character and a corresponding character of the preferred proposed spelling correction being a diacritical form thereof,
        the text input having a diacritical form of a character and a corresponding character of the preferred proposed spelling correction being a non-diacritical form thereof, and
        the text input having a diacritical form of a character and a corresponding character of the preferred proposed spelling correction being a different diacritical form thereof.

2. The method of claim 1, further comprising, responsive to the determining that a text input is at least possibly misspelled, initiating the outputting of a number of proposed spelling corrections.

3. The method of claim 1, further comprising outputting in a list the number of proposed spelling corrections, and outputting the preferred proposed spelling correction at a position of preference in the list.

4. The method of claim 1, further comprising:
    detecting a selection of the preferred proposed spelling correction;
    undergoing a predetermined quantity of repetitions of the determining, generating, outputting, providing, and detecting with respect to separate instances of the same text input and the same preferred proposed spelling correction; and
    detecting another inputting of the same text input and automatically replacing it with the same preferred proposed spelling correction.

5. The method of claim 4, further comprising detecting a delimiter input with respect to the another inputting of the same text input and, responsive thereto, initiating the automatically replacing.

6. The method of claim 1, further comprising comparing the text input with a linguistic database as at least a portion of the determining that the text input is at least possibly misspelled.

7. The method of claim 1, further comprising subjecting the text input to a number of linguistic rules as at least a portion of the determining that the text input is at least possibly misspelled.

8. An electronic device comprising:
    a processor apparatus comprising a processor and a memory;
    an input apparatus structured to provide input to the processor apparatus;
    an output apparatus structured to receive output signals from the processor apparatus; and
    the memory having stored therein a number of routines which, when executed on the processor, cause the electronic device to perform operations comprising:
        determining that a text input is at least possibly misspelled, the text input comprising one of a diacritical form and a non-diacritical form of each of a number of characters;
        generating a number of proposed spelling corrections of the text input comprising a first proposed spelling correction comprising at least one diacritical difference from the number of characters of the text input and a second proposed spelling correction comprising at least one base character difference from the number of characters of the text input;
        outputting the number of proposed spelling corrections of the text input; and
        providing the first proposed spelling correction as a preferred proposed spelling correction over the second proposed spelling correction, the at least one diacritical difference comprising at least one of:
            the text input having a non-diacritical form of a character and a corresponding character of the preferred proposed spelling correction being a diacritical form thereof,
            the text input having a diacritical form of a character and a corresponding character of the preferred proposed spelling correction being a non-diacritical form thereof and, the text input having a diacritical form of a character and a corresponding character of the preferred proposed spelling correction being a different diacritical form thereof.

9. The electronic device of claim 8 wherein the operations further comprise, responsive to the determining that a text input is at least possibly misspelled, initiating the outputting of a number of proposed spelling corrections.

10. The electronic device of claim 8 wherein the operations further comprise outputting in a list the number of proposed spelling corrections, and outputting the preferred proposed spelling correction at a position of preference in the list.

11. The electronic device of claim 8 wherein the operations further comprise:

detecting a selection of the preferred proposed spelling correction;

undergoing a predetermined quantity of repetitions of the determining, generating, outputting, providing, and detecting with respect to separate instances of the same text input and the same preferred proposed spelling correction; and detecting another inputting of the same text input and automatically replacing it with the same preferred proposed spelling correction.

12. The electronic device of claim 11 wherein the operations further comprise detecting a delimiter input with respect to the another inputting of the same text input and, responsive thereto, initiating the automatically replacing.

13. The electronic device of claim 8 wherein the operations further comprise comparing the text input with a linguistic database as at least a portion of the determining that the text input is at least possibly misspelled.

14. The electronic device of claim 8 wherein the operations further comprise subjecting the text input to a number of linguistic rules as at least a portion of the determining that the text input is at least possibly misspelled.

* * * * *

UNITED STATES PATENT AND TRADEMARK OFFICE
CERTIFICATE OF CORRECTION

| | | |
|---|---|---|
| PATENT NO. | : 7,949,516 B2 | Page 1 of 2 |
| APPLICATION NO. | : 11/848895 | |
| DATED | : May 24, 2011 | |
| INVENTOR(S) | : Vadim Fux | |

It is certified that error appears in the above-identified patent and that said Letters Patent is hereby corrected as shown below:

In column 3, line 2, "machine readable" should read --machine-readable--.

In column 5, line 31, "dictionary 52" should read --dictionary 46--.

In column 8, line 38, "right the icon" should read --right of the icon--.

In column 9, line 38, "actuation the <MENU>" should read --actuation of the <MENU>--.

In column 9, line 39, "rotation the track ball" should read --rotation of the track ball--.

In column 9, lines 59-60, "reduce menu 1032" should read --reduced menu 1035C--.

In column 9, line 62, "menu 1035A the user" should read --menu 1035A, the user--.

In column 11, line 1, "FIG. 11 depict" should read --FIG. 11 depicts--.

In column 11, line 13, "through the user of" should read --through the use of--.

In column 11, line 34, "strolling," should read --scrolling,--.

In column 11, line 37, "strolling," should read --scrolling,--.

In column 12, line 23, "track wheel 1032." should read --track ball 1032.--.

In column 12, line 53, "axis 1034." should read --axis 1034A.--.

In column 12, line 59, after "track ball", insert --1032--.

In column 12, line 61, "plurality axes" should read --plurality of axes--.

Signed and Sealed this
Twelfth Day of July, 2011

David J. Kappos
*Director of the United States Patent and Trademark Office*

CERTIFICATE OF CORRECTION (continued)
U.S. Pat. No. 7,949,516 B2

In column 14, line 20, "are disposed" should read --is disposed--.

In column 14, line 27, "are disposed" should read --is disposed--.

In column 14, line 29, "are structured" should read --is structured--.